(12) United States Patent
Matheson et al.

(10) Patent No.: US 7,865,823 B2
(45) Date of Patent: Jan. 4, 2011

(54) METHOD AND APPARATUS FOR SCHEMA VALIDATION

(75) Inventors: Jack Matheson, Austin, TX (US); Howard Tsoi, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 834 days.

(21) Appl. No.: 11/823,590

(22) Filed: Jun. 28, 2007

(65) Prior Publication Data

US 2009/0006943 A1    Jan. 1, 2009

(51) Int. Cl.
    *G06F 17/00* (2006.01)
(52) U.S. Cl. ...................................... 715/237
(58) Field of Classification Search ................. 715/234, 715/237
    See application file for complete search history.

(56) References Cited

U.S. PATENT DOCUMENTS

| | | | | |
|---|---|---|---|---|
| 6,070,254 | A * | 5/2000 | Pratt et al. ...................... 714/43 |
| 6,304,960 | B1 * | 10/2001 | Yeh et al. ...................... 712/236 |
| 7,036,073 | B2 * | 4/2006 | Jones et al. .................. 715/237 |
| 7,275,223 | B2 * | 9/2007 | Visvanathan et al. ........... 716/1 |
| 7,373,595 | B2 * | 5/2008 | Jones et al. .................. 715/234 |
| 7,487,166 | B2 * | 2/2009 | Angele et al. ............... 707/100 |
| 7,590,644 | B2 * | 9/2009 | Matsakis et al. ............ 707/101 |
| 7,596,748 | B2 * | 9/2009 | Raghavachari et al. ...... 715/237 |
| 7,657,832 | B1 * | 2/2010 | Lin ............................ 715/234 |
| 7,788,242 | B2 * | 8/2010 | Shavit et al. ................. 707/704 |
| 2003/0093677 | A1 * | 5/2003 | Neill ........................... 713/176 |
| 2003/0208351 | A1 * | 11/2003 | Hartman et al. ............... 703/22 |
| 2004/0006744 | A1 * | 1/2004 | Jones et al. .................. 715/514 |
| 2004/0205583 | A1 * | 10/2004 | Jones et al. .................. 715/513 |
| 2005/0055631 | A1 * | 3/2005 | Scardina et al. ............. 715/513 |
| 2006/0004729 | A1 * | 1/2006 | Zhilyaev et al. ................ 707/3 |
| 2006/0265673 | A1 * | 11/2006 | Visvanathan et al. ........... 716/1 |
| 2007/0016554 | A1 * | 1/2007 | Dapp et al. .................... 707/2 |
| 2007/0294602 | A1 * | 12/2007 | Miller ......................... 714/55 |
| 2008/0028376 | A1 * | 1/2008 | Kostoulas et al. ........... 717/143 |
| 2008/0301634 | A1 * | 12/2008 | Kuznetsov et al. .......... 717/115 |
| 2008/0313212 | A1 * | 12/2008 | Yu et al. ..................... 707/102 |

FOREIGN PATENT DOCUMENTS

| | | |
|---|---|---|
| WO | WO2006/116612 | 11/2006 |
| WO | WO2006/116650 | 11/2006 |
| WO | WO2006/116651 | 11/2006 |

OTHER PUBLICATIONS

Chen et al., XKvalidator: A Constraint Validator for XML, ACM 2002, pp. 446-452.*
Murata et al., Taxonomy of XML Schema Languages Using Formal Language Theory, Google 2005, pp. 1-45.*

(Continued)

*Primary Examiner*—Cong-Lac Huynh
(74) *Attorney, Agent, or Firm*—Trop, Pruner & Hu, P.C.

(57) ABSTRACT

In one embodiment, the invention may include receiving an XML schema and document with first, second, third, and fourth nodes. The second and third nodes may descend from the first node. The fourth node may descend from the second node. The third and fourth nodes may be simultaneously validated.

14 Claims, 2 Drawing Sheets

OTHER PUBLICATIONS

Reuter et al., Cardinalty Constraint Automata: A Core Technology for Efficient XML Schema-aware Parsers, ACM 2003, pp. 1-10.*

Riegel et al., A Lazy Snapshot Algorithm with Eager Validation, Google 2006, pp. 284-298.*

Abdullah et al., Protocol Specification and Automatic Implementation Using XML and CBSE, Google 2003, pp. 1-6.*

Lyons, The Difficulty of Schema Conformance Problems, Google 2004, pp. 1-15.*

Riegel et al., A Lazy Snapshot Algorithm with Eager Vaiidation, Google 2006, pp. 284-298.*

Henry S. Thompson, "Using Finite State Automata to Implement W3C XML Schema Content Model Validation And Restrictions Checking," 2003, pp. 1-14.

* cited by examiner

METHOD AND APPARATUS FOR SCHEMA VALIDATION

BACKGROUND

One method for validating extensible markup language (XML) documents against an XML schema includes breadth-first validation. Breadth-first validation may include a traversal of an XML schema using a finite state machine (FSM). A FSM may be thought of as a model of behavior composed of a finite number of states, transitions between those states, and actions. Regarding breadth-first validation, there may be a parent node with child nodes A and B. Child node A may have child nodes C and D. In breadth-first validation, child nodes A and B of a parsed XML document must both be validated before child nodes C and D (i.e., descendants) are traversed using a FSM. In other words, the document must be verified to conform to a certain standard (e.g., XML schema). In this scenario, each top-level compositor represents a FSM, and new FSMs are instantiated upon traversal of child nodes (e.g., child nodes A and B). Unfortunately, this non-parallel, breadth-first methodology fails to properly leverage the core capacity available with parallel processing in multicore processors and/or multithread software processing.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

Figure 1:
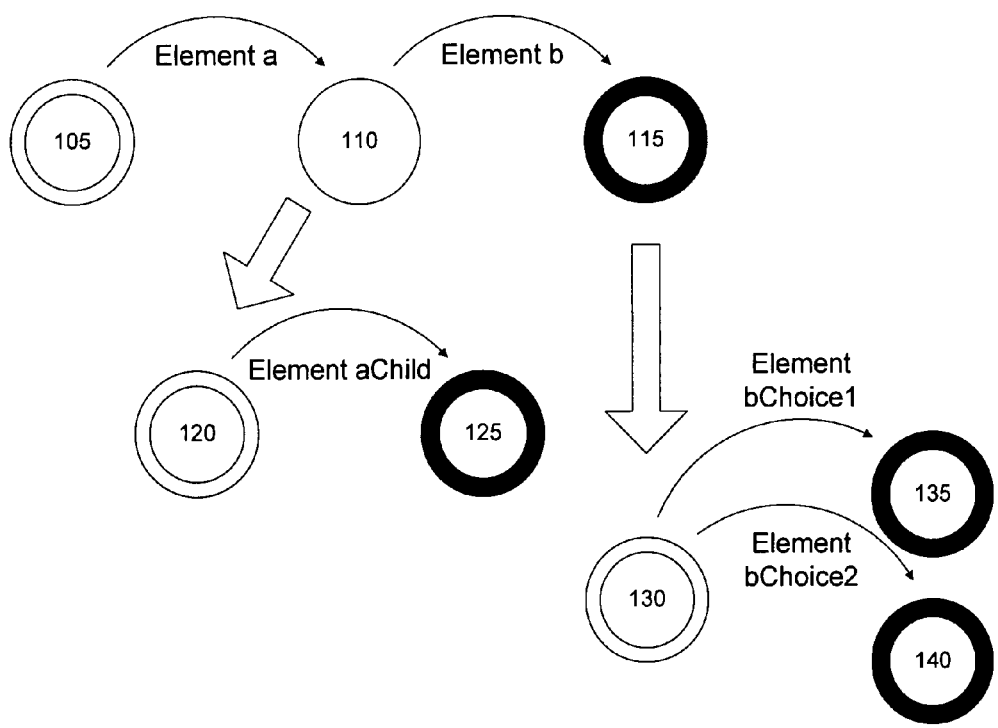
FIG. 1 is a state diagram for a finite state machine for a breadth first validation.

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

As will be explained more fully below, after an XML schema has been received and an XML document parsed and available as a tree structure, each node may have access to its immediate (i.e., direct descendent) children and can easily traverse a single compositor FSM. A compositor may describe the composition of a type's content. An XML schema may define multiple compositors that can be used in complex type definitions. Compositors may contain particles, which may include things like other compositors, element declarations, wildcards, and model groups. Once a single node has been locally validated (i.e., one node among many nodes is individually validated), the target schema type for each child node may be available, and new FSM validation traversals can be instantiated. For example, an XML Schema is defined in the following table.

TABLE 1

```
<xsd:schema xmlns:xsd="http://www.w3.org/2001/XMLSchema">
    <xsd:element name="root">
        <xsd:complexType>
            <xsd:sequence>
                <xsd:element name="a">
                    <xsd:complexType>
                        <xsd:sequence>
                            <xsd:element name="aChild" type="xsd:string"/>
                        </xsd:sequence>
                    </xsd:complexType>
                </xsd:element>
                <xsd:element name="b">
                    <xsd:complexType>
                        <xsd:choice>
                            <xsd:element name="bChoice1" type="xsd:integer"/>
                            <xsd:element name="bChoice2" type="xsd:integer"/>
                        </xsd:choice>
                    </xsd:complexType>
                </xsd:element>
            </xsd:sequence>
        </xsd:complexType>
    </xsd:element>
</xsd:schema>
```

The pseudocode in the above table may build a self contained FSM for the total complex type, along with a FSM for each new complex type. Each FSM may be linked into a host FSM at the state where validation for the child FSM becomes legal. In the above pseudocode, the complex type FSM associated with element "a" may be linked into the complex type FSM associated with "root" at the state immediately following a transition on element "a".

Through FSM chaining, a single master FSM may consist of smaller local FSMs, each of which may contain a start state and one or more accept states. The master FSM for the XML schema in the above table may be seen in FIG. 1, with machine instantiations shown as thicker arrows. The XML Schema has been translated into a FSM, where each complex element node links into a child FSM. Node 105 indicates a start state (represented by a double-ring non-bolded symbol). Using the above table, node 105 assumes the root element has been located. Consequently, validity of a structure with child node element a followed by child node element b is now determined. Node 110 represents an intermediate state after child node element a has been located. Node 115 represents an accepted state (represented by a double-ring bolded symbol) and that child node element b has been located. Node 120 represents a start state. Node 125 is an accepted state and represents that child node element aChild has been located and validated. Node 130 represents a start state. Node 135 represents an accepted state and that child node element bChoice1 has been located and validated. Node 140 represents an accepted state and that child node element bChoice2 has been located and validated. Using a traditional breadth-first validation, the nodes would be validated in the following sequence: 105, 110, 115, 120, 125, 130, and then 135 or 140.

In contrast in the traditional breadth-first analysis described above, "eager" breadth-first validation may take place concurrently with respect to any other breadth-first FSM validation. Therefore, any node being eagerly validated may validate each of its children eagerly. In other words, eager validation allows for parallel processing of XML schema validation.

Figure 2:
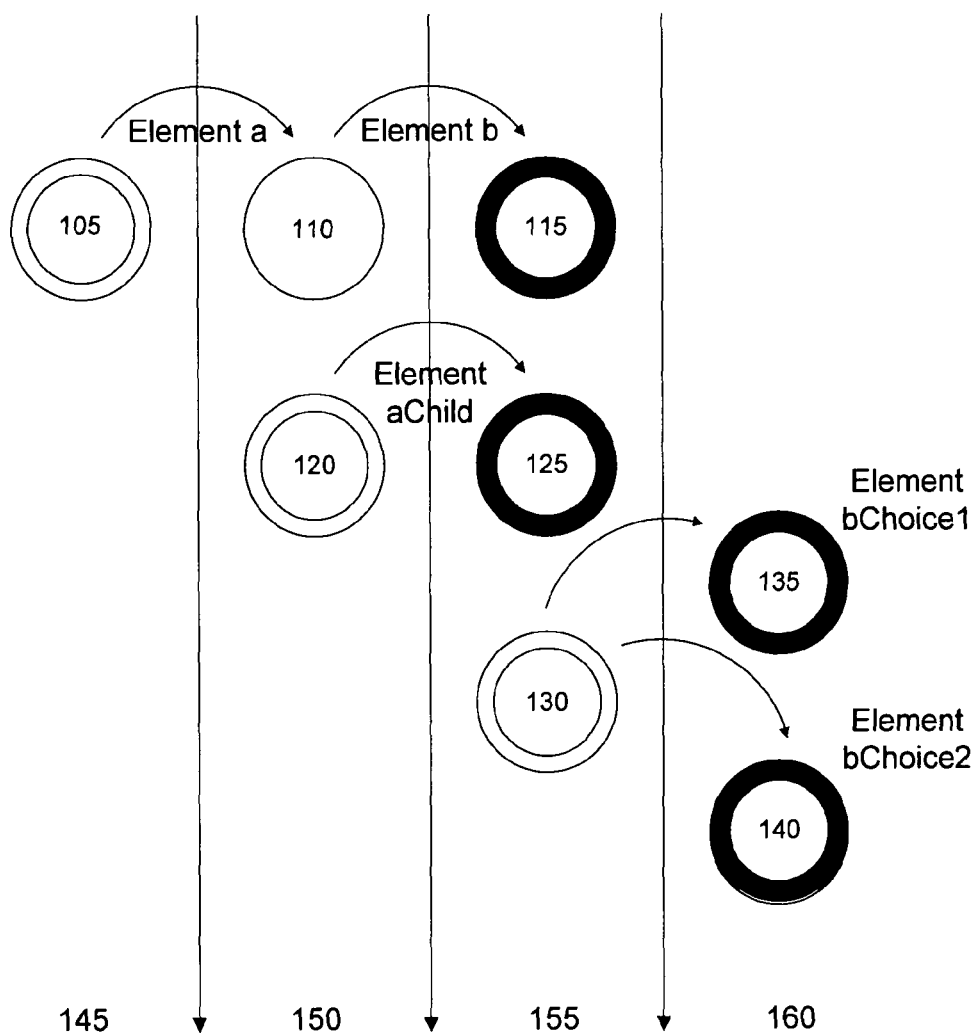
FIG. 2 is a state diagram concerning one embodiment of the invention.

FIG. 2 is a depiction of one embodiment of the invention. The pipe-lined result of eager breadth-first validation is illustrated using sequential time slices time slices 145, 150, 155, 160. There may or may not be intervening time slices among time slices 145, 150, 155, 160. As a state is entered, any FSM associated with that target node can be instantiated in parallel. More specifically, node 105 indicates a start state in time slice 145. Again, using Table 1, node 105 assumes the root element has been located. In time slice 150, node 110 again represents an intermediate state after child node element A (which descends from a parent node) has been located. However, still in time slice 150, node 120 represents a start state. In time slice 155, nodes 115, 125 and 130 are addressed in parallel. In other words, child node element B (which descends from the parent node) is validated concurrently (i.e., eagerly) with child node element aChild (i.e., a grandchild node that descends from child node element A). Node 130 again represents a start state. In time slice 160, node 135 again represents an accepted state and that child node element bChoice1 has been located and validated. Furthermore, node 140 represents an accepted state and that child node element bChoice2 has been located and validated. Thus, taking the XML Schema found in Table 1, a child state machine may validate against the XML Schema concerning the content of element "a" (e.g., <xsd:element name="aChild" type="xsd:string"/>) in parallel to another child state machine validating against the XML Schema concerning, for example, the sibling of element "a" such as element "b" (e.g., <xsd:element name="b" type=" . . . "). Furthermore, concurrent or parallel validation (i.e., eager validation) does not necessarily require that two validations begin and end simultaneously, although that is possible and included within the scope of the invention.

Thus, at each intermediate state in the FSM, the child element being processed can be "eagerly" validated against the associated follow-up FSM. This is legal because of the deterministic nature of XML Schema, as defined by Unique Particle Attribution in the W3C XML Schema specification. With no look-ahead requirement, once a state is entered, that state may become part of the master traversal, and no back-tracking may be necessary.

Accordingly, eager breadth-first validation may effectively support parallel operations. In one embodiment of the invention, such parallel operations may be conducted in a software multithreading environment. In one embodiment of the invention, such parallel operations may be conducted using a set of independent, interconnected processing elements (e.g., multicore processor). As a result, eager breadth-first validation may allow for job latency to scale downward as processing element count increases, thereby increasing utilization and throughput, even in workloads with a small number of tasks. This may allow higher core utilization looking forward, where intra-document parallelism may be a requirement. In one embodiment of the invention, any node eligible for validation can be processed on any available computing resource, such as a processor core. Through deterministic processing of the state machine, and the node-availability present in DOM models, a node may become eligible for validation one computation time slice after both the node's previous sibling and the node's parent have been validated. As the breadth-first walk proceeds, opportunities for parallelism increase as no structural limitations derived from the shape of the document tree apply. For example, if a parent node has a childA node, a grandchildA node descending from childA, a childB node, and a grandchildB node descending from childB, a processor core may process childA and grandchildB while another processor core processes childB and grandchildA.

Embodiments may be implemented in code that can be executed in many different system types. For example, embodiments may be implemented in computer systems such as server computers, personal computers, mobile devices such as cellular telephones and so forth. In such processor-based systems, an algorithm in accordance with an embodiment may be performed in a general-purpose processor such as a microprocessor, a graphics processing unit (GPU) or other such processing unit.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving an XML schema;
receiving a parsed XML document that includes a parent node, a first child node, a second child node, and a grandchild node;
validating the first child node; and
simultaneously validating the second child node and the grandchild node;
wherein the first child node directly descends from the parent node, the second child node directly descends from the parent node, and the grandchild node directly descends from the first child node.

2. The method of claim 1, further comprising:
validating the second child node with a first processor core; and
validating the grandchild node with a second processor core;
wherein a first processor includes the first processor core and the second processor core.

3. The method of claim 1, further comprising validating the second child node via a first thread and validating the grandchild node via a second thread, the first thread and the second thread validated using a single core processor.

4. The method of claim 1, further comprising:
validating the second child node via a first finite state machine; and
validating the grandchild node via a second finite state machine.

5. The method of claim 4, further comprising validating the parent node via a host finite state machine, the host finite state machine including the first finite state machine and the second finite state machine.

6. The method of claim 1, further comprising:
validating the first child node with a first processor core; and validating the second child node with a second processor core;

wherein a first processor includes the first processor core and the second processor core.

7. The method of claim 1, further comprising completing validation of the second child node after completing validation of the grandchild node.

8. An article comprising a medium storing instructions that enable a processor-based system to:

receive an XML schema;

receive a parsed XML document that includes a parent node, a first child node, a second child node, and a grandchild node;

validate the first child node; and simultaneously validate the second child node and the grandchild node;

wherein the first child node descends from the parent node, the second child node descends from the parent node, and the grandchild node descends from the first child node.

9. The article of claim 8 storing instructions that enable the system to:

validate the second child node with a first processor core; and validate the grandchild node with a second processor core;

wherein a first processor includes the first processor core and the second processor core.

10. The article of claim 8 storing instructions that enable the system to validate the second child node via a first thread and validate the grandchild node via a second thread, the first thread and the second thread to be validated using a single core processor.

11. The article of claim 8 storing instructions that enable the system to: validate the second child node via a first finite state machine; and validate the grandchild node via a second finite state machine.

12. The article of claim 11 storing instructions that enable the system to validate the parent node via a host finite state machine, the host finite state machine including the first finite state machine and the second finite state machine.

13. The article of claim 8 storing instructions that enable the system to:

validate the first child node with a first processor core; and validate the second child node with a second processor core;

wherein a first processor includes the first processor core and the second processor core.

14. The article of claim 8 storing instructions that enable the system to complete validation of the second child node after completing validation of the grandchild node.

* * * * *